United States Patent [19]

Kato et al.

[11] Patent Number: 5,270,096
[45] Date of Patent: Dec. 14, 1993

[54] BIAXIALLY ORIENTED POLYESTER FILM FOR MAGNETIC RECORDING MEDIA

[75] Inventors: Sumio Kato, Tokyo; Yoshihiro Oba; Hirofumi Murooka, both of Sagamihara; Nobuo Minobe, Matsuyama; Hideo Katoh, Tsukui, all of Japan

[73] Assignee: Teijin Limited, Osaka, Japan

[21] Appl. No.: 687,406

[22] Filed: Apr. 18, 1991

[30] Foreign Application Priority Data

Apr. 18, 1990 [JP] Japan .................................. 2-102352
Apr. 18, 1990 [JP] Japan .................................. 2-102353

[51] Int. Cl.$^5$ ........................................... B32B 27/36
[52] U.S. Cl. .................................... 428/143; 428/327; 428/329; 428/331; 428/480; 428/910
[58] Field of Search ............... 428/143, 327, 329, 331, 428/480, 910

[56] References Cited

U.S. PATENT DOCUMENTS

| | | | |
|---|---|---|---|
| 3,843,404 | 10/1974 | Haefele et al. | 117/235 |
| 3,884,870 | 5/1975 | Dodson et al. | 260/40 |
| 4,761,327 | 8/1988 | Hammano et al. | 428/220 |
| 4,818,581 | 4/1989 | Katoh et al. | 428/143 |
| 5,032,458 | 7/1991 | Dallmann et al. | 428/423.7 |

OTHER PUBLICATIONS

Chemical Abstracts vol. 87, No. 26, Dec. 26, 1977 Columbus, Ohio, USA Shigeru Shiozaki et al. "Abrasion-resistant polyester films", p. 33, col. 2 Abstract-No. 202 607k & Japan Kokai 77 78,953.
Chemical Abstracts vol. 109, No. 10, Sep. 5, 1988 Columbus, Ohio, USA Kazufumi Oshima et al. "Coated perpendicular magnetic recording media.", p. 802, col. 1, abstract-No. 84 870p & Japan Kokai Tokyo Koho JP 63 43 302.

Primary Examiner—Paul J. Thibodeau
Assistant Examiner—D. S. Nakarani
Attorney, Agent, or Firm—Wenderoth, Lind & Ponack

[57] ABSTRACT

A biaxially oriented polyester film for magnetic recording media improved in slipperiness, shaving resistance and scratch resistance by protrusions formed on the film surface, namely, a polyester film for magnetic recording media wherein the film is a biaxially oriented polyester film which contains (I) heat resistant high molecular particles having an average particle size of 0.3 to 1.5 $\mu$m in 0.001 to 0.5% by weight of the polyester, and (II) alumina particles having an independent existence rate of 80% or more and an average particle size of 0.06 to 0.2 $\mu$m in 0.05 to 1.0% by weight of the polyester and/or colloidal silica particles having an independent existence rate of 80% or more and an average particle size of 0.3 $\mu$m or less in 0.05 to 2.0% by weight of the polyester;

wherein the distribution curve, in the range where the height (x : $\mu$m) is 0.05 $\mu$m or more and the number of the protrusions (y : per mm$^2$) is 30 protrusions/mm$^2$ or more, of protrusions formed on the film surface satisfies the following formula A $$-11.4x+4 < \log y < -10.0x+5 \quad\quad A$$

wherein x is the height ($\mu$m) from the standard level and Y is the number of protrusions (per mm$^2$) counted when cutting was made in parallel to the standard level at a height of x; and wherein change ($\Delta\mu k$) of running friction coefficient of the film is below 0.15.

10 Claims, 1 Drawing Sheet

BIAXIALLY ORIENTED POLYESTER FILM FOR MAGNETIC RECORDING MEDIA

BACKGROUND OF THE INVENTION

1. Field of the invention

This invention relates to a biaxially oriented polyester film for magnetic recording media, more specifically to a biaxially oriented polyester film for magnetic recording media, which contains alumina particles or colloidal silica particles having particular charactristics as well as heat resistant high molecular particles, wherein by protrusions formed on the film surface by these particles slipperiness, shaving resistance and scratch resistance are improved.

2. Description of the Prior Art

Biaxially oriented polyester films represented by polyethylene terephthalate films are widely used for magnetic recording media, namely as a base film for media, because of their excellent physical and chemical characteristics.

In biaxially oriented polyester films, their slipperiness and shaving resistance are important factors exerting an influence on whether workability is good or bad in the preparation steps or processing steps or on the quality of products therefrom. When these properties are insufficient, for example in case where a biaxially oriented polyester film is used as a magnetic tape by applying thereon a magnetic layer, friction between the coating roller and the film surface is large, and thus shaved powder is formed and scratches are formed on the film surface. Further, when such a polyester film is used as a base film for magnetic tapes for VTR or data cartridge, shaved powder and scrathes are formed in the step where these tapes are taken up in a high speed in cassettes, and such formation becomes a cause of omission of signal (D/0).

For the purpose of improvement of the slipperiness and shaving resistance of films, a method is adopted in general which comprises reducing the contact area between the film and the guide roller or the like by giving the film surface unevenness. Such methods are roughly classified into (i) a method which comprises depositing on the film surface inert particles from the catalyst residue of the polyester using as a film raw material, and (ii) a method which comprises adding inert inorganic particles. In general, the larger the size of the fine particles in these raw material polyesters is, the larger the improvement effect of slipperiness is. However, in magnetic tape, particularly in precision use such as video use, it is necessary that the unevenness of the film surface is as minute as possible because it could directly be a cause of occurrence of drawbacks such as drop out that the particles are large, and thus it is the state of things that request to satisfy opposite characteristics at the same time is made.

For improvement in the slipperiness of a film, the prior art discloses a method in which inorganic particles such as silicon oxide, titanium dioxide, calcium carbonate, talc, clay and calcined kaolin are added to a polyester used as a film substrate (see, for example, Japanese Laid-Open Patent Publication No. 57562/1979), and a method in which fine particles containing calcium, lithium or phosphorus are deposited within the polymerization system for producing a polyester (see, for example, Japanese Patent Publication No. 32914/17).

In film formation, the above fine particles insoluble in the polyester form protrusions on the film surface, and increase the slipperinces of the film. The method of improving the slipperiness of the film by providing protrusions of fine particles, however, gives cise to the essential problem that the protrusions, on the other hand, impair the flatness of the film surface. Attempts have been made to provide a compromise between flatness and slipperiness by utilizing a combination of fine particles having a relatively large particle size and fine particles having a relatively small particles size.

U. S. Pat. No. 3,821,156 discloses a combination of 0.02 to 0.1% by weight of calcium carbonate having an average particle size of 0.5 to 30 microns and 0.01 to 0.5% by weight of silica or hydrated aluminum silicate having an average particle size of 0.01 to 1.0 microns.

U. S. Pat. No. 3,884,870 discloses a combination of about 0.002 to about 0.018% by weight of fine inert particles, such as calcium carbonate, calcined aluminum silicate, hydrated aluminum silicate, magnesium silicate, calcium silicate, calcium phosphate, silica, alumina, barium sulfate, mica and diatomaccous earth, having a particle size of about 0.5 to about 30 microns and about 0.3 to about 2.5% by weight of fine inert particles, such as silica, calcium carbonate, calcined calcium silicate, hydrated calcium silicate, calcium phosphate, alumina, barium sulfate, magnesium, sulfate and diatomaceous earth, having a particle size of about 0.01 to about 1.0 micron.

U. S. Pat. No. 3,980,611 discloses that fine particles of calcium phosphate having three particle size grades of less than 1.0 micron, 1 to 2.5 microns and more than 2.5 microns are combined, and added to a polyester in a total amount of not more than 5,000 ppm.

Japanese Patent Publication No. 41,648/1980 (Laid-Open Patent Publication No. 71,154/1978) proposes a combination of 0.22 to 1.0% by weight of fine particles having a particle size of 1.2 to 2.5 microns and 0.003 to 0.25% by weight of fine particles having a particle size of 1.8 to 10 microns, the fine particles being those of an oxide or inorganic salt of an element of Groups II, III and IV of the periodic table.

Japanese Patent Publication No. 40,929/1980 (Laid-Open Patent Publication No. 11,908/1977) discloses a combination of 0.01 to 0.08% by weight of fine inert inorgenic particles having a particle size of 3 to 6 microns and 0.08 to 0.3% by weight of fine inert inorganic particles having a particle size of 1 to 2.5 microns, the total amount of these fine particles having different particles sizes being 0.1 to 0.4% by weight and the ratio of the large size particles to the small size particles being from 0.1 to 0.7.

Japanese Laid-Open Patent Publication No. 78,953/1977 discloses a biaxially oriented polyester film containing 0.01 to 0.5% by weight of inert particles having a particle size of 10 to 1,000 microns and 0.11 to 0.5% by weight of calcium carbonate having a particle size of 0.5 to 15 microns. This patent document lists up various inorganic substances other than calcium carbonate as the inert particles having a particle size of 10 to 1,000 microns in its general description, but only discloses specific examples in which silica or clay normally available as fine particles having a particle size of 10 to 1,000 microns is used as an inorganic substance.

U. S. Pat. No. 4,761,327 discloses a biaxially oriented polyester containing 0.005 to 1% by weight of silicone resin particles having an average particle size of 0.3 to 4 $\mu$m and 0.005 to 1% by weight of inert particles having an average particle size of 0.01 to 1 $\mu$m wherein the average particle size is smaller than the average particle size of the silicone resin particles.

Incidentally, such cases are lately increasing that, for the purpose of cost reduction, in guide posts fixed in cassettes, particularly in VTR cassettes metal guides whose surface is not sufficiently finished or plastic guides are used in place of the usual metal guides whose surface is sufficiently finished. However, the surface of these guide posts is extremely rough. thus when, in the case of magnetic tapes wherein a back coat is not provided, the usual technique to enhance the slipperiness and shaving property of the films is applied to such tapes, wherein shaved power and scratches formed in the step to take up the tapes in cassettes at a high speed and D/O level is heightened; therefore an improvement is strongly desired.

SUMMARY OF THE INVENTION

An object of the invention is to provide a biaxially oriented polyester film for magnetic recording media which is excellent in slipperiness and has excellent shaving resistance and scratch resistance in high speed take-up of magnetic tapes even in cassettes using insufficiently surface-finished metal guides or plastic guides, to say nothing of is cassettes using sufficiently surface-finished metal guides.

In accordance with this invention, the above object can be accomplished by a polyester film for magnetic recording media wherein the film is a biaxially oriented polyester film which contains (I) heat resistant high molecular particles having an average particle size of 0.3 to 1.5 μm in 0.001 to 0.5% by weight of the polyester, and (II) alumina particles having an independent existence rate of 80% or more and an average particle size of 0.06 to 0.2 μm in 0.05 to 1.0% by weight of the polyester and/or colloidal silica particles having an independent existence rate of 80% or more and an average particle size of 0.3 μm or less in 0.05 to 2.0% by weight of the polyester; wherein the distribution curve, in the range where the height (x: μm) is 0.05 μm or more and the number of the protrusions (y: per mm$^2$) is 30 protrusions/mm$^2$ or more, of protrusions formed on the film surface satisfies the following formula A $$-11.4x + 4 < \log y < -10.0x + 5 \quad \text{A}$$

wherein x is the height (μm) from the standard level and y is the number of protrusions (per mm$^2$) counted when cutting was made in parallel to the standard level at a height of x; and wherein change (Δμk) of running friction coefficient of the film is below 0.15.

Other objects and advantages of the invention will be apparent by the following description.

DETAILED DESCRIPTION OF THE PREFERRED EMBODIMENTS

Figure 1:
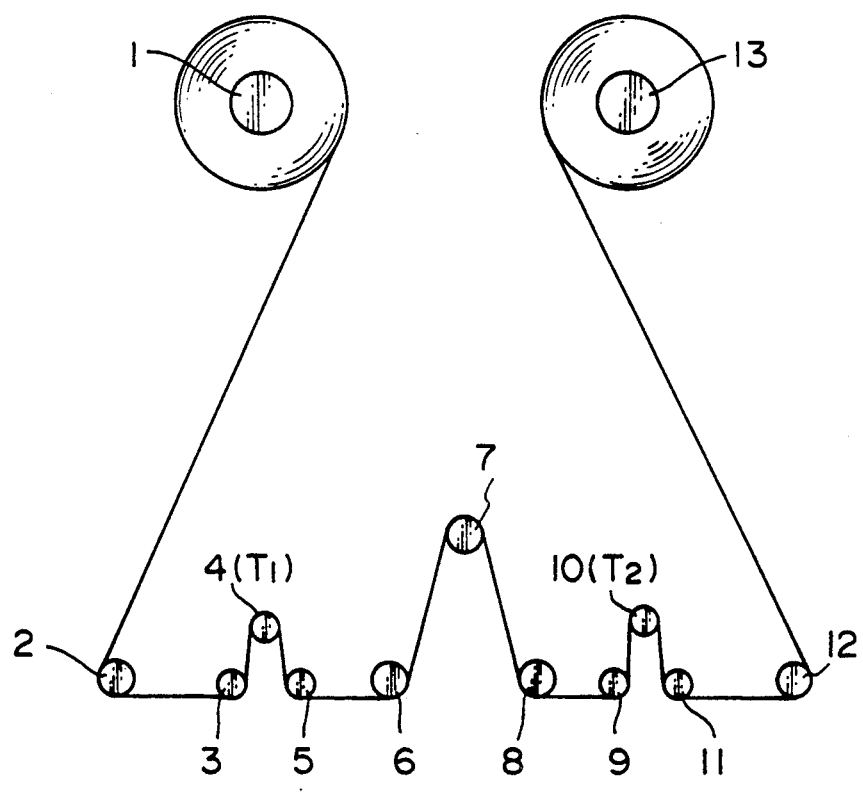
FIG. 1 is a schematic drawing of an apparatus for measurement of a running friction coefficient of films. Symbols in the drawing are as follows.
  1: unwind reel, 2: tension controller, 4: tension detecting machine (inlet), 7: fixed bar, 10: tension detecting machine (outlet), 13: take-up reel

The polyester in this invention is a saturated polyester containing an aromatic dicarboxylic acid as a main acid component and an aliphatic glycol as a main glycol component. This polyester is substantially linear and has film formability, particularly film formability by malt molding. As examples of the aromatic dicarboxylic acid there can be mentioned terephthalic acid, naphthalenedicarboxylic acid, isophthalic acid, diphenoxyethanedicarboxylic acid, diphenyldicarboxylic acid, diphenyl etherdicarboxylic acid, diphenylsulfonedicarboxylic acid, diphenylketonedicarboxylic acid, anthracenedicarboxylic acid, etc. As examples of the aliphatic glycol there can be mentioned polymethylene glycols having 2 to 10 carbon atoms such as ethylene glycol, trimethylene glycol, tetramethylene glycol, pentamethylene glycol, hexamethylone glycol and decamethylene glycol, and alicyclic diols such as cyclohexanedimethanol, and the like.

In the invention preferably used among the above polyesters are polyesters having an alkylene terephthalate and/or an alkylene naphthalate as main components. Particularly preferred among these polyesters are polyethylene terephthalate, polyethylene-2,6-naphthalate, and copolymers wherein 80 mol % or more of all the dicarboxylic acid components is/are terephthalic acid and/or 2,6-naphthalenedicarboxylic acid and 80 mol % or more of all the glycol components is ethylene glycol. In the above, 20 mol % or less of all the acid components can be the above aromatic dicarboxylic acids other than terephthalic acid and/or 2,6-naphthalenedicarboxylic acid, and can for example be an aliphatic dicarboxylic acid such as adipic acid or sebacic acid or an alicyclic dicarboxylic acid such as cyclohexane-1,4-dicarboxylic acid or the like. Further, 20 mol % or less of all the glycol components can be the above glycols other than ethylene glycol, and can for example be an aromatic diol such as hydroquinone, resorcinol or 2,2-bis(4-hydroxyphenyl)propane, an aliphatic diol having an aromatic ring such as 1,4-dihydroxydimethylbenzene, a polyalkylene glycol(polyoxyalkylene glycol) such as polyethylene glycol, polypropylene glycol or polytetramethylene glycol, or the like.

Further, polyesters in the invention also include, for example, those wherein a component derived from an oxycarboxylic acid such as an aromatic oxy acid e.g. hydroxyaromatic acid or an aliphatic oxy acid e.g. w-hydroxycaproic acid or the like is copolymerized or bound in 20 mol % or less based on the total amounts of the dicarboxylic acid component and the oxycarboxylic acid component.

Further, polyesters in the invention also include those wherein a polycarboxylic acid or poly hydroxy compound having trifunctional groups or more, for example trimellitic acid, pentaerithritol or the like is copolymerized in such an amount that the linear structure is substantially maintained, for example in an amount of 2 mol % or less based on all the acid components.

Polyesters in the invention are known per se and can be prepared by a method known per se.

Preferred as the above polyesters are those wherein are intrinsic viscosity determined at 35° C. as a solution in o-chlorophenol is about 0.4 to about 0.9.

The biaxially oriented polyester film of the invention has many minute protrusions. These minute protrusions are derived from lots of substantially inert heat resistant high molecular particles and alumina particles and/or colloidal silica particles contained in the polyester in a dispersed state.

In the invention, it is important that the distribution curve, in the range where the height (x: μm) is 0.05 μm or more and the number of the protrusion (y: per mm$^2$)

is 30 protrusions/mm² or more, of protrusions formed on the film surface satisfies the following formula A $$-11.4x+4 < \log y < -10.0x+5 \quad \text{...} \quad A$$

wherein x is the height (μm) from the standard level and y is the number of protrusions (per mm²) counted when cutting was made parallel to the standard level at a height of x.

In case where the protrusion distribution curve does not satisfy the above formula A, when such a film is used as a magnetic tape without provision of a back coat, running becomes insufficient, or even when a magnetic layer is provided, the magnetic layer surface becomes rough due to the presence of large protrusions, and as a result its electromagnetic conversion characteristic becomes insufficient, and thus such a film is not suitable as a film for magnetic recording media.

The heat resistant high molecular particles to be used for formation of surface protrusions in the invention are preferably those wherein the temperature for 5% heating loss under a nitrogen gas atmosphere is 310° C. or more, further 330° C. or more, particularly 350° C. or more. As examples of such particles there can be mentioned silicone resin particles, crosslinked acrylic resin particles, crosslinked polystyrene particles, crosslinked polyester particles, Teflon particles, polyimide particles, etc. Preferred among them are silicone resin particles.

Further, the average particle size of the heat resistant high molecular particles is 0.3 to 1.5 μm, and the amount thereof is 0.001 to 0.5% by weight based on the polyester. Preferred average particle size is 0.5 to 1.0 μm and preferred content is 0.005 to 0.3% by weight. When the average particle size of the heat resistant high molecular particles in below 0.3 μm, the height of protrusions formed is insufficient, and thus the slipperiness of the obtained film becomes insufficient. On the other hand, when the average particle size goes beyond 1.5 μm, the height of the formed protrusions becomes too high, and thus the film surface becomes too rough for use in magnetic recording media, and therefore such a case is not suitable. Further, when the addition content of the heat resistant high molecular particles is below 0.001% by weight, the number of the formed protrusions is insufficient and slipperiness becomes insufficient, and on the other hand, the addition content goes beyond 0.5% by weight, the film surface becomes too rough, such a film is unsuitable for magnetic recording media.

Further, preferred as heat resistant high molecular particles are those having a spherical shape and a sharp particle size distribution, and it is particularly preferred that the volume shape coefficient(f) and the particle size distribution ratio (γ) satisfy the following formula B and the following formula C, respectively.

$$0.4 < f \leq \pi/6 \quad \text{...} \quad B$$

wherein f is $V/D^3$, V is an average volume (μm³) per one particle and D is an average maximal particle size (μm) of particles, $$1 < \gamma < 1.4 \quad \text{...} \quad C$$

wherein γ is and $D_{25}$/and $D_{75}$ and $D_{25}$ are $D_{75}$ are average particle sizes (μm) respectively when the cumulative weight of the particles are 25% and 75%.

In the invention, alumina particles and/or colloidal silica particles are used in combination with the above heat resistant high molecular particles, and these particles form minute protrusions between high protrusions formed by the heat resistant high molecular particles on the film surface. It is considered that by the presence of these minute protrusions the friction coefficient of the film ground part is lowered even in contact with metal guides whose surface is not sufficiently finished or plastic guides, and in cooperation with high protrusions formed by the heat resistant high molecular particles, excellent shaving resistance and scratch resistance are exerted.

Alumina particles to be used in the invention are those having an independent existence rate in the film of 80% or more and an average particle size of 0.06 to 0.2 μm, preferably 0.06 to 0.15 μm. The amount of the alumina particles is 0.05 to 1.0% by weight, preferably 0.1 to 0.5% by weight based on the polyester. When the average particle size of the alumina particles is below 0.06 μm, protrusions formed at the ground part become small, and thus lowering of the friction coefficient becomes insufficient. On the other hand the size goes beyond 0.2 μm, protrusions formed become too large and the shaving property at the time of contact with the guide in a high speed becomes worse, and thus such cases are not desirable. Further, in below 0.05% by weight of the addition content of alumina particles the protrusion number is insufficient and thus improvement of the shaving resistance and scratch resistance cannot be expected, whereas in an addition content beyond 1.0% by weight the protrusions of the alumina particles overlap at the ground part and shaving resistance becomes worse.

The alumina particles are preferably γ-type crystalline particles having a Moh's hardness of 8 or less. When α-type crystalline alumina particles having a Moh's hardness of 9 are used, the rollers, etc. in the preparation steps of magnetic tapes, etc. are sometimes impaired in case of long time running because of the added particles being too hard, and further, sometimes the metal guides are impaired at the time of running and take-up in the cassettes of magnetic tapes, etc. and shaved powder and base scratches are fomed.

Further, colloidal silica particles to be used in the invention have a characteristic that their independent existence rate in the film is 80% or more, and have an average particle size of 0.3 μm or less, preferably 0.04 to 0.2 μm. The amount thereof is 0.05 to 2.0% by weight, preferably 0.1 to 0.8% by weight based on the polyester. When the average particle size of the colloidal silica particles goes beyond 0.3 μm, the formed protrusions become too large and the shaving property at the time of contact with the guides in a high speed becomes worse, which is undesirable. In an addition content of the colloidal silica particles below 0.05% by weight the number of protrusions formed at the ground is insufficient and improvement in shaving resistance and scratch resistance cannot be expected, whereas in an addition content thereof beyond 2.0% by weight overlap of the protrusions of the colloidal silica particles are formed at the ground part and thus the shaving resistance becomes worse. Further, it is also important that 80 % or more of the colloidal silica particles are independent in the film and in case of this being unsatisfied its shaving resistance becomes worse.

It is further preferred that the colloidal silica particles are those containing Na element in an amount of 100 to 3000 ppm in the powder weight ratio. When the Na content goes beyond the above range the improvement effect of scratch resistance becomes poor or the independent existence rate of the particles in the film lowers, and its shaving resistance tends to become worse.

As methods for preparation of colloidal silica containing Na element in the above range there are methods which comprise preparing active silica sol using sodium silicate as a starting material by an dialysis method, electrolysis, a salting out method, an ion exchage resin method on the like and then carrying out polymerization, but the ion exchange resin-polymerization method is most preferred in view of uniformity of the resulting particles.

Although average particle sizes, addition amounts, etc. are different between alumina particles and colloidal silica particles in the invention, it is considered that this is because the shapes, strength, etc. of protrusions formed by the particles are different based on the differences of the hardness, shapes, etc. of the particles.

Alumina particles or colloidal silica particles having an independent existence rate of 80% or more in the invention can be obtained, for example, by dispersing fine particles as a raw material in a glycol, particularly ethylene glycol, treating them with a crushing machine such as a sand grinder, and thereafter further subjecting it to a high speed centrifugal classification treatment to remove the agglutinated particles. At that time it is preferred for enhancement of the independant existence rate of the particles to make the crushing and classification treatments in 10% or less by weight, further 5% or less by weight of the fine powder slurry concentration. Further, it is preferred to place the resulting powder slurry, before or during polymerization of the master polyester, in the reaction vessel and intimately mix the slurry with the reaction mixture or the formed polymer. It is particularly preferred, for enhancement of the dispersibility and independent existence rate of the particles in the polymer, to further melting knead the thus obtained master polyester (pellets) using a biaxial screw type kneader or extruder having a high shearing force.

In order to mix heat resistant high molecular particles with a polyester in preparation of a biaxially oriented polyester film of the invention, it is sufficient either to place the heat resistant high molecular particles, before or during polymerization of the polyester, in the reaction vessel or add them at the time of pelletization after completion of the polymerization in the reaction vessel, and then sufficiently knead the particles with the polyester in an extruder, or to add the heat resistant high molecular particles at the time of melt extrusion of the polyester into a sheet and sufficiently carry out kneading in the extruder. Further, although the alumina particles and/or colloidal silica particles may sufficiently be kneaded with the polyester be using the above slurry of the fine particles at the polymerization time of the polyester, it is preferred to sufficiently knead the particles with the polyester at the time of melt extrusion of the above master pellets into a sheet in an extruder. Incidentally, this master pellet method can preferably be applied to the heat resistant high molecular particles.

The biaxially oriented polyester film of the invention is required to have a change ($\Delta\mu k$) of the running friction coefficient below 0.15. This change ($\Delta\mu k$) of the running friction coefficient is a change of the running friction coefficient when a film is repeatedly run 50 times in a running friction coefficient measurement apparatus shown in FIG. 1, and calculated by the following formula $$\Delta\mu k = \mu_{50} - \mu k_1$$

wherein $\mu k_{50}$ is a friction coefficient after 50th running and $\mu k_1$ is a friction coefficient after first running. When the change ($\Delta\mu k$) of the running friction coefficient is 0.15 or more, the friction coefficient becomes too high in repeated use, shaving powder is formed and the problem of running stop takes place. The friction coefficient ($\mu k_{50}$) after 50th running is preferably 0.38 or less, further 0.33 or less.

It is preferred, in view of the running friction characteristic and the electromagnetic conversion characteristic in use as a magnetic recording medium, that the biaxially oriented polyester film of the invention has a surface roughness Ra of 8 to 25 nm, further 10 to 20 nm.

A biaxially oriented polyester film of the invention can, for example, be prepared by melt molding a polyester at a temperature of from the melting point (Tm: °C.) to (Tm+70)°C. to obtain a nonstretched film having an intrinsic viscosity of 0.35 to 0.9 dl/g; stretching the nonstretched film in a monoaxial direction (in the longitudinal or horizontal direction), at a temperature of (Tg−10) to (Tg+70)°C. (Tg: the glass transition temperature of the polyester) and at a 2.5 to 5.0-fold magnification; and then stretching the monoaxially stretched film in the direction rectangular to the above stretching direction (when the first stretching was made in the longitudinal direction, the second stretching is made in the horizontal direction), at a temperature of Tg(°C.) to (Tg+70)°C. and in a 2.5 to 5.0-fold magnification In this connection, the area stretching magnification is preferably 9 to 22 times, further 12 to 22 times. The stretching method may either be simultaneous biaxial stretching or successive biaxial stretching.

Further, the biaxially oriented film can be thermofixed at a temperature of (Tg+70)°C. to Tm(°C.). For example, as for a polyethylene terephthalate film it is preferred to carry out thermofixing at 190 to 230° C. The thermofixing time is for example 1 to 60 seconds.

The biaxially oriented polyester film of the invention is excellent in slipperiness, and at the same time has excellent shaving resistance and scratch resistance even in running in contact with metal guides whose surfaces are not sufficiently finished or plastic guides, and thus is extremely useful for magnetic recording media, particularly as a base film for magnetic tapes for VTR.

Various physical properties and characteristics in the invention were measured and are defined as follows.

(1) Average particle size (d) of particles

It is measured using a CP-50 type centrifugal particle size analyzer produced by Shimazu Corporaton. From a cumulative curve between particles of each particle size and their existence amount calculated based on the obtained centrifugal sedimentation curve, a particle size corresponding to 50 mass percent is read out, and this value is used as the above average particle size (refer to Book "Ryudo Sokutei Gijutsu" (Particle size measurement technique), published by Nikkan Kogyo Shinbun Sha, pages 242 to 247, 1975)

(2) Particle size distribution ratio ($\gamma$) of particles

A cumulative curve between the particles of each particle size and their existence amount is calculated and drawn, based on the centrifugal sedimentation curve obtained by measurement of the average particle size of the particles, a particle size ($D_{25}$) at which the cumulative weight of the particles cumulated from those having a larger particle size becomes 25 percent and a particle size ($D_{75}$) at which the cumulative weight of the particles becomes 75% are read out, and the former value is divided by the latter value ($D_{25}/D_{75}$) to calculate the particle size distribution ratio ($\gamma$) of each particle.

(3) Running friction coefficient ($\mu k$) of film

It is measured as follows using an apparatus shown in FIG. 1. In FIG. 1, 1 denotes an unwind reel, 2 a tension controller, 3, 5, 6, 8, 9 and 11 free rollers, 4 a tension detection machine (inlet), 7 a fixed bar made of stainless steel SUS304 (outer diameter 5mm $\phi$, surface roughness Ra=0.02 $\mu$m), 10 a tension detection machine (outlet), 12 a guide roller and 13 a take-up reel, respectively.

A film cut in a width of ½ inch is contacted with the fixed bar 7 at an angle $\theta = (152/180)\pi$ radial (152°) and moved (rubbed) at a speed of 200 cm/min, under the circumstance of temperature 20° C. and humidity 60%. Outlet tension ($T_2$: g) when the tension controller 2 is adjusted so that inlet tension $T_1$ becomes 35 g is detected by an outlet tension-detecting machine after the film ran 90 m, and a running friction coefficient $\mu k$ is calculated by the following equation.

$$\mu k = (2.303/\theta) \log (T_2/T_1)$$
$$= 0.868 \log (T_2/35)$$

(4) Change ($\Delta \mu k$) of the running friction coefficient of film

A film 10 m long is made to run repeatedly 50 times at a film movement speed of 2 m/min using a running friction coefficient measurement apparatus of the above (3). $\Delta \mu k$ is calculated by the following equation referring the first friction coefficient to $\mu k_1$ and the 50th friction coefficient to $\mu k_{50}$.

$$\Delta \mu k = \mu k_{50} - \mu k_1$$

(5) Surface roughness (Ra) of film

Ra (center line average roughness) is calculated according to JIS B 0601. A chart (film surface roughness curve) is drawn under the condition of needle radius $2\mu$ and load 0.07 g using a stylus type surface roughness tester (SURFCOM 3B) produced by TOKYO SEIMITSU CO., LTD., the part of the measurement length L is picked up in the direction of the center line from the resulting film surface roughness curve, and when a roughness curve $y = f(x)$ is depicted using the center line of this picked up part as the x axis and the longitudinal direction as the y axis, a value (Ra:$\mu$m) given by the following equation is defined as the surface roughness of the film surface.

$$Ra = \frac{1}{L} \int_O^L |f(x)| dx$$

In the invention, 8 measurements are made using 0.25 mm as a standard length, and Ra is determined as the average value based on the five measurements as a result of removal of three measurements from the measurements of the large values.

(6) Protrusion distribution on the film surface

The profile of protrusions on the film surface is three-dimensionally imaged using a three-dimensional roughness tester (SE-30K) produced by Kosaka Kenkyusho under the condition of needle diameter 2 $\mu$mR, needle pressure 30 mg, measurement length 1 mm, sampling pitch 2 $\mu$m, cut off 0.25 mm, longitudinal direction enlargement magnification 20,000 fold, horizontal direction enlargement magnification 200 fold and scanning number 150.

Such a plane is used as a standard level (0 level) that, when the profile is cut by a plane in the direction rectangular to the thickness direction of the film, the total of the cross-sectional area of the profile of each protrusion becomes 70% of the area of the measurement region of the film, and the number of protrusions cut when cutting is made, in paralled to the plane of the standard level, with a plane distant therefrom by a distance x in the height direction of the protrusions, is expressed as y. A protrusion distribution curve is drawn by successively increasing or decreasing x, reading out the number of y at the points and plotting the values.

(7) Volume shape coefficient (f)

Photographs of the particles taken by a scanning type electron microscope, for example, at a 5000-fold magnification by 10 fields of view, the average value of the maximum diameters is measured about each filed of view using for example, an image analysis treatment apparatus Luzex 500 (produced by Nihon Regulater), and further, the average value in the 10 fields of view is determined and designated as D.

The average volume $\{V = (\pi/6)d^3\}$ of the particles is determined from the average particle size of the particles determined in the above (1) of the measurement methods, and a shape coefficient f is calculated from the following equation.

$$f = V/D^3$$

wherein V represents the average volume ($\mu$m$^3$) per one particle and D represents the average maximum particle size ($\mu$m) of the particles.

(8) Independent existence rate of particles

A biaxially oriented polyester film obtained by film forming is fixed on a sample stage for a scanning type electron microscope, the film surface is subjected to an ion etching treatment under the following conditon using a spattering apparatus produced by JEOL Ltd. (JEC-1100 type ion spattering apparatus). The above sample stage is installed in a bell jar, the degree of vacuum is raised up to a vacuum state of about $10^{-3}$ Torr, and ion etching is carried out at a voltage of 0.25 kV and an electric current of 12.5 mA for about 10 minutes. Further, gold spatter is provided onto the film surface using the apparatus to form a gold thin film layer on the order of about 200 Å, and measurement is made at a 20,000-fold magnification using a scanning type electron microscope. The measurement is made at random about 100 fields of view, a totally observed particle number a and a agglutinated and peeled particle number b (those accompanied by void generation over the overall width between the neighboring particles by the stretching stress at the time of film forming) are determined, and the independent existence rate of particles is determined by the following equation.

$$\text{Independent existence rate of particles} = \frac{a-b}{a} \times 100$$

(9) Shaving property and scratch property

In the same apparatus as that in FIG. 1 used for measurement of a film running friction coefficient, a fixed bar of 6 $\phi$ which was obtained by bending a SUS sintered plate into a cylindrical shape and has a surface roughness Ra of 0.15 $\mu$m in place of the stainless steel SUS 304-made fixed bar of 7, and 6 $\phi$ tape guides of the carbon black-containing polyacetal produced by DAI-ICHI SEIKO CO., LTD. are used, and the tape is made to run 200 m at an angle of 30° and at a speed of 300 m/min so that inlet tensile force becomes 50 g/½inch.

After the running, shaved powder which adhered on the guide and scratches of the tape after running are evaluated.

Shaved powder judgment

⊚ Shaved powder is not observed at all ○ Slight shaved powder is observed
Δ Existence of shaved powder is recognized at a glance
× Lots of shaved powder is adhering Scratch judgment ⊚ Scratches are not observed at all ○ 1 to 5 scratches are observed Δ 6 to 15 scratches are observed
× 16 or more scratches are observed

(10) Na content in colloidal silica fine particles

Colloidal silica fine particles are completely dissolved in hydrofluoric acid and Na is quantatively determined by the atomic absorption method, whereby the Na content in the fine particles is determined.

Hereinafter, this invention is further described according to examples.

EXAMPLES 1 and 2 AND COMPARATIVE EXAMPLES 1 TO 4

Dimethyl terephthalate and ethylene glycol were copolymerized in a conventional method, with the addition of manganese acetate as an ester interchange catalyst, antimony trioxide as a polymerization catalyst, phosphorous acid as a stabilizer and addition perticles as a lubricant shown in Table 1, to obtain polyethylene terephthalates having an intrinsic viscosity (orthochlorophenol, 35° C.) of 0.62.

Pellets of each polyethylene terephthalate after drying at 170° C. for 3 hours are supplied into the hopper of an extruder, molton at a melting temperature of 280° to 300° C., and extruded through a slit type die of 1 mm onto a rotating cooling drum having a surface finish on the order of 0.3 s and a surface temperature of 20° C. to obtain a nonstretched film of 200 82 m. The thus obtained nonstretched film was preheated, heated between low speed and high speed rollers by one IR heater having a surface temperature of 900° C. from the upper part of 15 mm to stretch it 3.6 times, quenched, supplied to a stenter, and horizontally stretched 3.9 times at 105° C. The resulting biaxially oriented film was thermofixed at a temperature of 205° C. for 5 seconds to obtain a therefomixed biaxially oriented film having a thickness of 14.2 $\mu$m.

The characteristics of the thus obtained biaxially oriented polyester films of 14.2 $\mu$m are shown in Table 1.

When the protrusion distribution curves of the thus obtained films were investigated, those of Examples 1 and 2 and Comparative examples 1, 2 and 4 satisfied the following formula (A), but about those of Comparative example 3 the number y (per mm$^2$) of the protrusions did not always satisfy the relation of log y < −10.0x+5 in all the prescribed range.

$$-11.4x+4 < \log y < -10.0x+5 \ldots \quad (A)$$

EXAMPLES 3 and 4 AND COMPARATIVE EXAMPLES 5 to 8

Dimethyl terephthalate and ethylene glycol were copolymerized in a conventional method, with the addition of manganese acetate as an ester interchange catalyst, antimony trioxide as a polymerization catalyst, phosphorous acid as a stabilizer and addition particles as a lubricant shown in Table 1, to obtain polyethylene terephthalates having an intrinsic viscosity (orthochlorophenol, 35° C.) of 0.62.

Pellets of each polyethylene terephthalate after drying at 170° C. for 3 hours are supplied into the hopper of an extruder, molten at a melting temperature of 280° to 300° C., and extruded through a slit type die of 1 mm onto a rotating cooling drum having a surface finish on the order of 0.3 s and a surface temperature of 20° C. to obtain a nonstretched film of 200 $\mu$m.

The thus obtained nonstretched film was preheated, heated between low speed and high speed rollers by one IR heater having a surface temperature of 900° C. from the upper part of 15 mm to stretch it 3.6 times, quenched, supplied to a stenter, and horizontally stretched 3.9 times at 105° C. The resulting biaxially oriented film was thermofixed at a temperature of 205° C. for 5 seconds to obtain a thermofixed biaxially oriented film having a thickness of 14.2 $\mu$m.

The characteristics of the thus obtained biaxially oriented polyester films of 14.2 $\mu$m are shown in Table 2.

When the protrusion distribution curves of the thus obtained films were investigated, those of Examples 3 and 4 and Comparative examples 5, 6 and 8 satisfied the following formula (A), but about those of Comparative example 7 the number y (per mm$^2$) of the protrusions did not always satisfy the relation of log y < −10.0x+5 in all the prescribed range.

$$-11.4x+4 < \log y < -10.0x+5 \ldots \quad (A)$$

TABLE 1

| Item | | Unit | Example 1 | Example 2 | Comparative example 1 | Comparative example 2 | Comparative example 3 | Comparative example 4 |
|---|---|---|---|---|---|---|---|---|
| Added particles (1) | Kind | — | Silicon resin particles | Silicon resin particles | Silicon resin particles | Silicon resin particles | Kaolin | Spherical silica particles |
| | Average | $\mu$m | 0.65 | 0.35 | 0.65 | 0.65 | 0.80 | 0.60 |

TABLE 1-continued

| | Item | Unit | Example 1 | Example 2 | Comparative example 1 | Comparative example 2 | Comparative example 3 | Comparative example 4 |
|---|---|---|---|---|---|---|---|---|
| | particle size | | | | | | | |
| | Added amount | % | 0.13 | 0.30 | 0.13 | 0.13 | 0.20 | 0.18 |
| | Volume shape coefficient | — | 0.48 | 0.50 | 0.48 | 0.48 | Tabular | 0.50 |
| | Particle size distribution ratio | — | 1.1 | 1.1 | 1.1 | 1.1 | 2.1 | 1.1 |
| Added particles (2) | Kind | — | γ-type crystalline alumina particles | same as left | same as left | same as left | same as left | same as left |
| | Average particle size | μm | 0.10 | 0.10 | 0.28 | 0.15 | 0.10 | 0.10 |
| | Added amount | % | 0.35 | 0.35 | 0.50 | 0.35 | 0.30 | 0.35 |
| | Independent existance rate | % | 94 | 94 | 90 | 75 | 94 | 94 |
| Surface roughness | | nm | 18 | 12 | 19 | 18 | 19 | 16 |
| Running friction coefficient | | — | 0.15 | 0.18 | 0.16 | 0.16 | 0.24 | 0.15 |
| Change (Δμk) of running friction coefficient | | — | 0.10 | 0.13 | 0.10 | 0.10 | 0.20 | 0.06 |
| SUS sintered plate friction | Shaving property | — | ⊙ | ○ | Δ | Δ | Δ | ○ |
| | Scratch | — | ○ | ○ | Δ | X | Δ | Δ |
| poly-acetal tape guide friction | Shaving property | — | ○ | ⊙ | Δ | ○ | ○ | ○ |
| | Scratch | — | ○ | ⊙ | X | Δ | Δ | X |

TABLE 2

| | Item | Unit | Example 3 | Example 4 | Comparative example 5 | Comparative example 6 | Comparative example 7 | Comparative example 8 |
|---|---|---|---|---|---|---|---|---|
| Added particles (1) | Kind | — | Silicon resin particles | Silicon resin particles | Silicon resin particles | Silicon resin particles | Kaolin | Spherical silica particles |
| | Average particle size | μm | 0.65 | 0.35 | 0.65 | 0.65 | 0.80 | 0.60 |
| | Added amount | % | 0.13 | 0.30 | 0.13 | 0.13 | 0.20 | 0.18 |
| | Volume shape coefficient | — | 0.48 | 0.50 | 0.48 | 0.48 | Tabular | 0.50 |
| | Particle size distribution ratio | — | 1.1 | 1.1 | 1.1 | 1.1 | 2.1 | 1.1 |
| Added particles (2) | Kind | — | Colloidal silica particles | same as left | same as left | same as left | same as left | same as left |
| | Average particle size | μm | 0.12 | 0.06 | 0.35 | 0.17 | 0.12 | 0.12 |
| | Added amount | % | 0.20 | 0.20 | 0.40 | 0.20 | 0.20 | 0.20 |
| | Independent existance rate | % | 92 | 92 | 90 | 75 | 92 | 92 |
| | Na content | ppm | 900 | 900 | 900 | 900 | 900 | 900 |
| Surface roughness | | nm | 18 | 12 | 20 | 18 | 19 | 16 |
| Running friction coefficient | | — | 0.15 | 0.19 | 0.15 | 0.17 | 0.24 | 0.15 |
| Change (Δμk) of running friction coefficient | | — | 0.08 | 0.12 | 0.07 | 0.10 | 0.21 | 0.07 |

TABLE 2-continued

| Item | | Unit | Example 3 | Example 4 | Comparative example 5 | Comparative example 6 | Comparative example 7 | Comparative example 8 |
|---|---|---|---|---|---|---|---|---|
| SUS sintered plate friction | Shaving property | — | ⊚ | ○ | X | Δ | Δ | ○ |
| | Scratch | — | ○ | ⊚ | Δ | X | Δ | Δ |
| poly-acetal tape guide friction | Shaving property | — | ○ | ○ | Δ | ○ | ○ | ○ |
| | Scratch | — | ○ | ⊚ | X | Δ | Δ | X |

As apparent from Tables 1 and 2, the films of the invention have excellent surface properties for magnetic recording media and excellent slipperiness, and further have, even against metal guides, whose surface is not sufficiently finished and plastic guides, excellent shaving resistance and scratch resistance, and thus have extremely excellent characteristics as a biaxially oriented polyester film for magnetic recording media.

What we claim is:

1. A polyester film for magnetic recording media wherein the film is biaxially oriented polyester film which contains (I) a heat resistant polymer particles having an average particle size of 0.3 to 1.5 μm in 0.0001 to 0.5% by weight of the polyester, and
    (II) alumina particles having an independent existence rate of 80% or more and an average particle size of 0.06 to 0.2 μm in 0.05 to 1.0% by weight of the polyester or collodial silica particles having an independent existence rate of 80% or more and an average particle size of 0.3 μm or less in 0.05 to 2.0% by weight of the polyester;

wherein the distribution curve, in the range where the height x is 0.05 μm or more and the number of the protrusion y is 30 protrusions/mm² or more, of protrusions formed on the film surface satisfies the following formula A $$-11.4x+4 < \log y < -10.0x+5 \quad \text{...A}$$

wherein x is the height in μm from the standard level wherein said standard level determined by a plane which is at a right angle to the film thickness and which cuts through a three dimensional image profile of protrusions on the surface of said film such that the total cross sectional area of the cut image profile is 70% of the area of a measuring region of the film and y is the number of protrusions per mm² counted when cutting was made parallel to the standard level at a height of x; and wherein the change $\Delta\mu k$ of the running friction coefficient of the film is below 0.15.

2. The polyester film for magnetic recording media of claim 1 wherein the heat resistant polymer particles of the component (I) are those wherein the temperature for 5% heating loss under a nitrogen gas atmosphere is 310° C. or more.

3. The polyester film for magnetic recording media of claim 1 wherein the heat resistant polymer particles are those wherein the volume shape coefficient (f) satisfies the following formula B $$0.4 < f \leq \pi/6 \quad \text{...B}$$

wherein f is $V/D^3$, V is an average volume μm³ per one particle and D is an average maximal particle size μm γ satisfies the following formula C $$1 < \gamma < 1.4 \quad \text{...C}$$

wherein γ is D25/D75 and D25 and D75 are average particle sizes μm respectively when the cumulative weight of the particles are 25% and 75%.

4. The polyester film for magnetic recording media of claim 1 wherein the heat resistant polymer particles are silicone resin particles.

5. The polyester film for magnetic recording media of claim 1 wherein the particles of the component (II) are the alumina particles.

6. The polyester film for magnetic recording media of claim 5 wherein the alumina particles are γ type crystalline alumina particles having a Moh's hardness less than 8.

7. The polyester film for magnetic recording media of claim 1 wherein the particles of the component (II) are the colloidal silica particles.

8. The polyester film for magnetic recording media of claim 7 wherein the colloidal silica particles contain an Na element in an amount of 100 to 3,000ppm based on the silica particles.

9. The polyester film for magnetic recording media of claim 1 wherein the running friction coefficient $\mu k_{50}$ of the film is 0.38 or less.

10. The polyester film for magnetic recording media of claim 1 wherein the surface roughness Ra of the film is 0.008 to 0.025 μm.

* * * * *